United States Patent [19]

Rollins et al.

[11] Patent Number: 4,635,898

[45] Date of Patent: Jan. 13, 1987

[54] POSITIVE PULLBACK SYNCHRO VALVE ACTUATOR

[75] Inventors: Jack Rollins; William Coppin; Thaddeus Karabin, all of Muncie, Ind.

[73] Assignee: Maxon Corporation, Muncie, Ind.

[21] Appl. No.: 821,825

[22] Filed: Jan. 23, 1986

[51] Int. Cl.⁴ ............................................. F16K 31/524
[52] U.S. Cl. ........................................ 251/229; 74/25; 74/89; 74/568 FS; 251/251; 251/263; 251/305
[58] Field of Search .............. 251/251, 263, 229, 305, 251/308; 74/568 R, 568 FS, 25, 89

[56] References Cited

U.S. PATENT DOCUMENTS

| | | | |
|---|---|---|---|
| 2,315,171 | 3/1943 | Voorheis | 251/253 |
| 3,352,167 | 11/1967 | Winters | 74/568 FS |
| 3,706,438 | 12/1972 | Condon et al. | 251/251 |
| 3,792,408 | 2/1974 | Gorgens et al. | 74/568 FS |

*Primary Examiner*—George L. Walton
*Attorney, Agent, or Firm*—Robert M. Ward

[57] ABSTRACT

The improved positive pullback synchro valve actuator of the present invention comprises a universal cam assembly having a frame supporting a deformable cam strip which is operatively connected to a plurality of contour adjustment screws and which may be adjusted to form the desired shape of the cam. The cam strip is further operatively connected to a plunger which is disposed for movement transversely of the cam strip and in the longitudinal direction. The apparatus is positive in its pullback, as the plunger is linked to the universal cam assembly, such that when the operator turns the universal cam assembly, there is assurance that the associated valve is closed. In some applications, the plunger may be connected to a shaft yoke which is disposed transversely of the plunger for converting the longitudinal movement into limited reciprocal rotational movement. In these embodiments, the shaft yoke engages a valve shaft which is urged by such yoke into limited reciprocal rotational movement. In such embodiments, a butterfly valve disc may be connected to the valve shaft for opening and closing the butterfly valve with respect to a butterfly valve seat.

24 Claims, 2 Drawing Figures

POSITIVE PULLBACK SYNCHRO VALVE ACTUATOR

BACKGROUND OF THE INVENTION

The present invention relates generally to valves and more particularly to an improved positive pullback synchro valve actuator for use on a wide variety of different types of valves.

In the prior art, it has been necessary to adjust the relative proportions of air vis-a-vis gas or oil for purposes of providing a proper mixture for combustion. In determining the proper mixture for combustion and controlling the same, certain non-linear adjustments have been necessary with regard to either one or both of the fluids which form the mixture.

In the prior art, it has also been difficult to achieve proper proportioning of fluids mixed for combustion in a proportioning apparatus. Also, apparatus for such proportioning of fluids in the prior art have been expensive and/or difficult to produce in accurate embodiments.

Further, in the prior art, various compensations in the proportioning of the air-fuel ratio have been necessary due to variables which occur in the firing operation. Such factors include change in the pressure at which fuel or air is supplied to the proportioning device, and which will tend to be slightly reduced as the firing rate increases. This is true both with respect to the combustion air and the fuel supply. Also, changes in the interior frictional resistance of the air or fuel piping as caused by the increase or decrease of the rate of flow of fluids therethrough are also factors. Yet further, changes in internal furnace pressure such as are caused by an increase or decrease in the firing rate of the burners must be compensated for.

The prior art has found it difficult to accomplish all of the above necessary factors in a mechanically efficient and cost efficient manner. As a partial solution to these problems, valve actuators including universal cam strip assemblies have been suggested. However, prior art valves which have utilized adjustable cam strips have had the deficiency of not being able to provide assurance that the valve was closed when the cam assembly was rotated by the operator.

Accordingly, it is a principal object of the improved positive pullback synchro valve actuator of the present invention to materially reduce the difficulties and disadvantages of the prior art devices.

SUMMARY OF THE INVENTION

The improved positive pullback synchro valve actuator of the present invention is useful for control of a wide variety of different types of valves, and in a wide variety of different usages including oil and gas valves. The valve actuator of the present invention comprises a universal cam assembly coupled in one operative embodiment to a plunger. In some applications, the plunger operates a standard knife valve, or other straight-line valve. In other applications, a yoke means connected to a shaft supported butterfly valve may be used.

The universal cam assembly of the improved positive pullback synchro valve actuator of the present invention includes a frame supporting at least one deformable carrier cam strip contacted by, and preferably secured to, a plurality of contour adjustment screws to determine the contour of the cam. Also included are means for selectively adjusting the depth of the screws for purposes of effecting the shape of the deformable cam as selected.

Plunger means are attached to the universal cam assembly and disposed for movement generally transversely of the cam strip means, such that the plunger means is positively urged by the cam strip in a longitudinal direction. Return spring means are attached to the plunger for urging return of the plunger. In addition, the cam strip is connected to the plunger, such that turning of the universal cam assembly assists the spring in return of the plunger, and assures a positive return thereof. Hence, such universal cam strip both pushes and pulls the plunger for positive drive in both longitudinal directions.

In some preferred applications, shaft yoke means are connected to and disposed transversely of the plunger means for converting the longitudinal motion into limited reciprocal rotational motion.

In such applications, a valve shaft is engaged by the shaft yoke means to have limited reciprocal rotational motion imparted thereto. A butterfly valve disc is connected to the valve shaft for opening and closing in response to the limited reciprocal rotational motion of the valve shaft. The valve disc is disposed within a valve seat to open and close the flow of fluid through the valve.

In preferred embodiments, the universal cam assembly is disposed generally in the shape of a portion of an arc of a circle, such that the partial rotation of the frame of the universal cam assembly will impart a push and pull circulo-contacting motion ot the carrier cam strip means relative to the plunger means.

The details of the improved positive pullback synchro valve actuator of the present invention are set forth hereinbelow in conjunction with the drawing, brief description of the drawing, detailed description of the preferred embodiments and the appended claims.

BRIEF DESCRIPTION OF THE DRAWING

The following drawings set forth the improved positive pullback synchro valve actuator of the present invention in which common numerals are utilized for common elements, and in which.

DETAILED DESCRIPTION OF PREFERRED EMBODIMENTS

Figure 1:
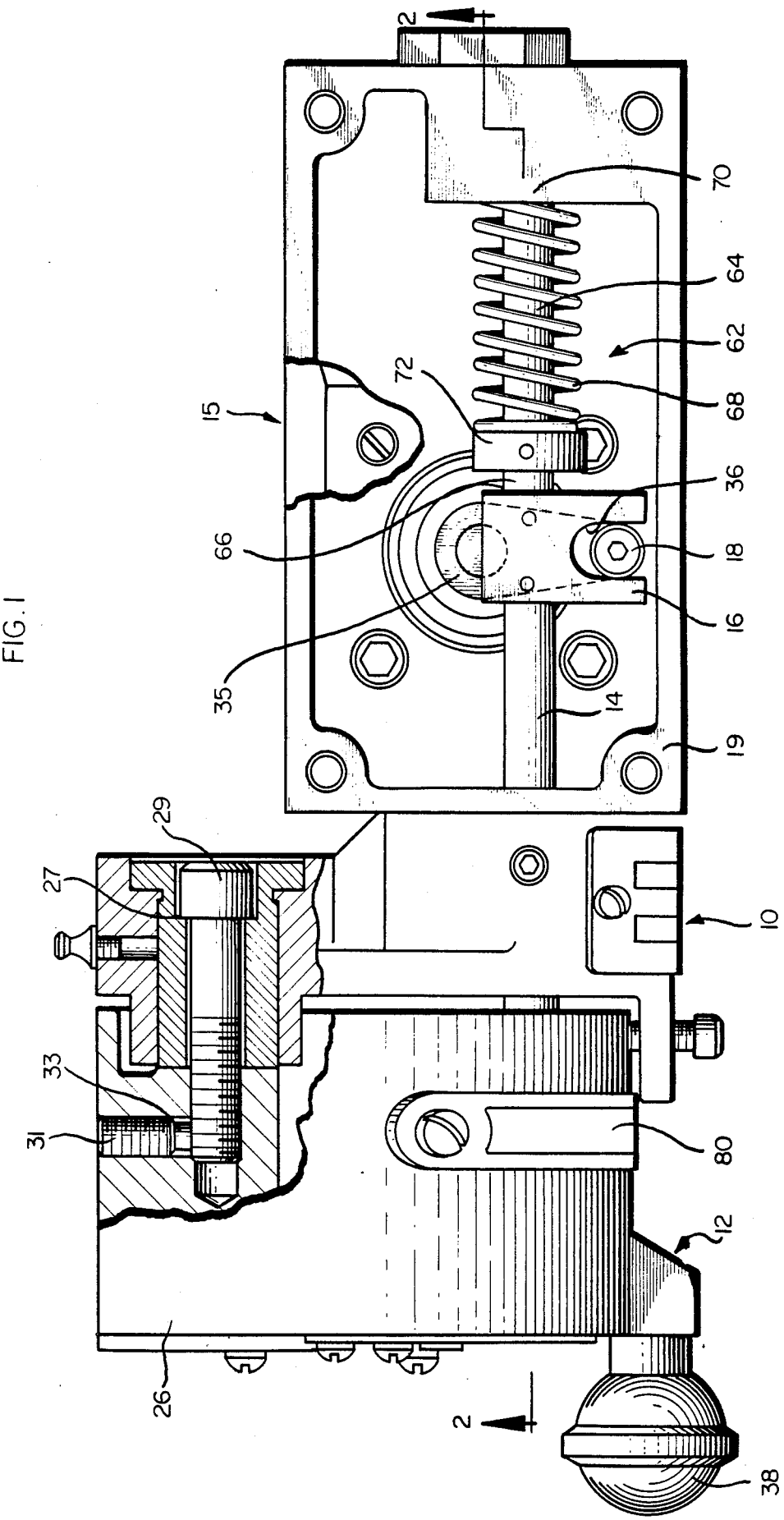
FIG. 1 is a plan view of one embodiment of the improved positive pullback synchro valve actuator of the present invention with the housing removed and/or partially fragmented to illustrate the exterior of the universal cam assembly frame, with the plunger means urging against the return spring means disposed on the spring shaft.

The improved positive pullback synchro valve actuator of the present invention comprises a universal cam assembly which is connected to a plunger. The improved positive pullback synchro valve actuator of the present invention is useful for control of a wide variety of different types of valves, and in a wide variety of different usages including oil and gas valves. The valve actuator of the present invention comprises a universal cam assembly coupled in one operative embodiment to a plunger. In some applications, the plunger operates a standard knife valve, or other straight-line valve. In other applications, a yoke means connected to a shaft supported butterfly valve may be used.

The universal cam assembly of the present invention comprises a frame which supports at least one deformable carrier cam strip. The deformable carrier cam strip is operatively contacted on a first side thereof by the respective ends of a plurality of contour adjustment screws. The contour adjustment screws are disposed in spaced array along the deformable carrier cam strip. Means are provided for selectively adjusting the depth of the contour adjustment screws, as set forth in greater detail hereinbelow, to adjust the shape of the deformable carrier cam strip means thereby to vary the linearity of the proportional opening and closing of said valve.

A plunger is disposed for movement generally transversely of the carrier cam strip means and contacts the carrier cam strip means on the second side thereof, which side is opposite the contour adjustment screws for relative movement thereagainst. The plunger means are thereby positively urged in push and pull fashion by the cam strip means in the respective longitudinal directions to open and close the associated valve.

In some preferred applications, shaft yoke means are connected to and are disposed transversely of the plunger means for converting the longitudinal motion of the plunger means into limited reciprocal rotational movement. The shaft yoke means includes valve shaft engagement means. The valve shaft is engaged by said valve shaft engagement means of the shaft yoke means to be urged into limited reciprocal rotational motion therefrom.

In some of these preferred applications, a butterfly valve disc is connected to the valve shaft to be adjustably opened and closed by the limited reciprocal rotational motion of the valve shaft. A butterfly valve seat is disposed for open and closed engagement by the butterfly valve disc within said valve.

In preferred embodiments of the improved positive pullback synchro valve actuator of the present invention, the contour adjustment screws of said universal cam assembly are preferably disposed in end view generally in the shape of a portion of an arc of a circle. The frame of the universal cam assembly is preferably mounted in such embodiments for partial rotation with respect to the plunger means to provide a push and pull, circulo-contacting motion to the carrier cam strip means relative to the plunger means.

In such preferred embodiments, guide means are carried by the frame and are provided thereon to guide the cam strip means in contacting relationship with the plunger means. Also in such preferred embodiments, the contour adjustment screws are threadably disposed through the frame for depth adjustment with respect thereto.

The contour adjustments screws include in preferred embodiments thereof rotational engagement means disposed at the distal end thereof for application of rotational force thereto, thus to adjust the depth disposition thereof.

The carrier cam strip means in such preferred embodiments comprises at least one lower cam strip for contacting the plunger means and at least one upper cam strip for guiding the movement of the lower cam strip relative to the plunger means. In such preferred embodiments of the approved positive pullback synchro valve actuator of the present invention, at least one upper cam strip is secured to the contour adjustment screws near the proximal ends thereof by end bolts.

In other preferred embodiments, the plunger means is supported and directed for longitudinal movement by a plunger bushing.

Preferred embodiments further comprise return spring means for urging the plunger means in the opposite respective longitudinal direction. Such return spring means preferably comprises a return spring shaft attached at the proximal end thereof to the plunger, and coil spring means mounted on the return spring shaft. The return spring shaft is preferably supported at the distal end thereof by shaft retention means. Also in such preferred applications, the return spring means is pivotably connected to the shaft yoke means for pivotalable motion with respect thereto during the limited reciprocal rotational motion of the shaft yoke means. In further preferred applications of the present invention, the plunger means may be pivotably connected to the shaft yoke means for pivotable motion with respect thereto during the limited reciprocal rotational motion of the shaft yoke means.

The improved positive pullback synchro valve actuator of the present invention may further comprise in alternative preferred embodiments coil spring retention means to retain the coil spring means around the return spring shaft in non-binding relationship.

Bearing means are also provided around the valve shaft for journaling the same for limited reciprocal rotational motion. Sealing means preferably in the form of at least one O-ring are provided around the valve shaft between the butterfly disc and the shaft yoke means.

Also in preferred embodiments, indicator means are disposed externally of the frame for indicating the relative position of the universal cam assembly, and thereby the the relative volume of the flow through the valve.

Figure 2:
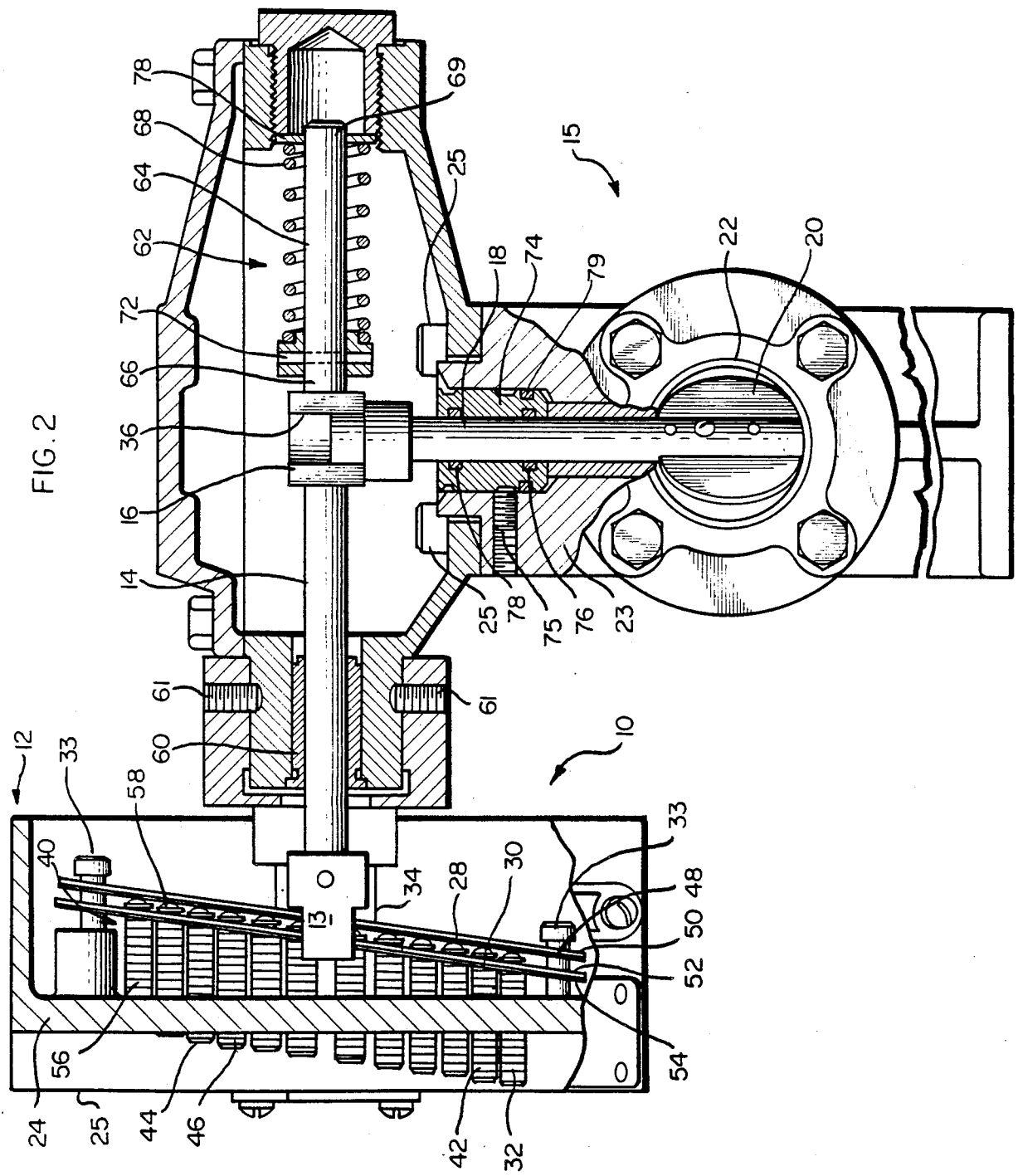
FIG. 2 is a cross sectinal view taken along lines 2—2 of FIG. 1 and further showing the carrier cam strip, the contour adjustment screws, and the depth selection means of the universal cam assembly engaging the plunger means, which in turn in this application drives the shaft yoke means in limited reciprocal rotational movement, to impart the same in turn to the attached valve shaft and butterfly valve disc which is disposed within the butterfly valve seat.

Referring now to the drawing and to FIG. 1 in particular, the improved positive pullback synchro valve actuator of the present invention generally 10 comprises a universal cam assembly generally 12, as depicted more clearly in FIG. 2. Universal cam assembly 12 is connected by means of a U-shaped cam follower 13 to a plunger 14.

In the particular illustrative application shown, the valve generally 15 is a butterfly valve, although various straight line valves such as a standard knife valve may be operated by valve actuator 10. In such butterfly application usage, plunger 14 drives a shaft yoke 16 in limited reciprocal rotational movement, thereby to impart the same motion to a connected valve shaft 18. Yoke housing 19 contains plunger 14, shaft yoke 16, and a portion of valve shaft 18. Valve shaft 18 bears thereon a butterfly valve disc 20 which in turn is disposed within a butterfly valve seat 22 to control the flow of a fluid through said valve 10. Butterfly valve disc 20 and butterfly valve seat 22 are contained within valve housing 23, which is connected to yoke housing 19 by means of bolts 25. Universal cam assembly 12 is limitedly reciprocally rotated with respect to plunger 14, by means of relative rotation of cam housing 25. Such relative rotation means are depicted in FIG. 1 wherein bushing 27 carries socket head cap screw 29 for such relative rotation. Socket set screw 31 cushioned by lead pad 33 holds socket head cap screw 29 firmly in place.

The universal cam assembly 12 of the present invention includes a cam frame 24 within cam housing 25. Said cam frame 24 supports at least one cam strip generally 26. The deformable carrier cam strip 26 is operatively contacted on a first side 28 thereof by the respective ends 30 of a plurality of contour adjustment screws 32. The contour adjustment screws 32 are disposed in spaced array along the deformable carrier cam strip 26. Cam strip retainer bolts 33,33 support cam strip means 26 from frame 24.

As shown in FIGS. 1 and 2, plunger 14 is disposed for movement generally transversely of the carrier cam strip means 26 and is connected operatively to and contacts the carrier cam strip means 26 on the second side 34 thereof, which side 34 is opposite the contour adjustment screws 32 for resultant movement thereby. As shown in FIG. 2, preferaby U-shaped cam follower 13 is disposed around cam strip 26 and is attached to plunger 14 at the opposite side thereof. Plunger 14 is thereby urged by the cam strip means 26 in a longitudinal direction.

In the illustrative application shown of butterfly valve 15, the shaft yoke 16 is connected to and disposed transversely of plunger 14 for converting the longitudinal motion of plunger into limited reciprocal rotational movement. The shaft yoke 16 is supported by shaft yoke pivot bracket 35 and includes valve shaft engagement surface 36. The valve shaft 18 is engaged by said valve shaft engagement surface 36 of the shaft yoke 16 to be urged into limited reciprocal rotational motion therefrom.

Butterfly valve disc 20 is connected to valve shaft 18 to be adjustably opened and closed by the limited reciprocal rotational motion of valve shaft 18. Butterfly valve seat 22 is disposed for open and closed engagement by butterfly valve disc within said valve 10, as shown in FIG. 2.

Contour adjustment screws 32 of said universal cam assembly 12 are disposed in end view generally in the shape of a portion of an arc of a circle. Frame 24 of universal cam assembly 12 is preferably mounted in such embodiments for partial rotation with respect to plunger 14 to provide positive respective push and pull, circulo-contacting motion to the carrier cam strip means 26 relative to plunger 14 by means of handle 38, as shown in FIG. 1.

Cam guide means generally 40 are carried by frame 24 and are provided thereon to guide the cam strip means 26 in contracting relationship with plunger 14. Also in such preferred embodiments of valve actuator 10, screws 32 are disposed through frame 24 for depth adjustment with respect thereto. Contour adjustments screws 32 include in preferred embodiments thereof rotational engagement means and the distal end 46 thereof for application of rotational force thereto, thus to adjust the depth disposition thereof.

Carrier cam strip means 26 comprises a pair of lower cam strips for 48,50 for contacting plunger 14 and a pair of upper cam strips 52,54 for guiding the movement of lower cam strips 48,50 relative to plunger 14. In such preferred embodiments of the improved positive pullback synchro valve actuator 10 of the present invention, upper cam strips 52,54 are secured to the contour adjustment screws 32 near the proximal ends 56 thereof by E-rings 58. In alternative embodiments, end bolts may be utilized in place of E-rings 58.

Plunger 14 is supported and directed for longitudinal movement by a plunger bushing which is secured to yoke housing 19 by means of socket set screws 61.

Preferred embodiments of the valve actuator 10 of the present invention further comprise return spring means generally 62 for urging plunger 14 in a direction opposite to the longitudinal direction from cam strip means 26. Such return spring means 62 preferably comprises return spring shaft portion 66 of plunger 14 and a coil spring 68 mounted on return spring shaft portion 66 of plunger 14. The return spring shaft portion 66 is preferably supported at the distal end 69 thereof by shaft retention means 70. Also in such preferred embodiments, the return spring means 62 is connected to the shaft yoke 16 for motion with respect thereto during the limited reciprocal rotational motion of the shaft yoke 16.

The improved positive pullback synchro valve actuator 10 of the present invention may further comprise in alternative preferred embodiments a coil spring retention bracket 72 for retaining the coil spring 68 around return spring shaft 66 in nonbinding relationship.

Bearings 74 are also provided around valve shaft 18 for journaling the same for limited reciprocal rotational motion, and are secured to valve housing 23 by socket set screws 75. O-rings 76,78 are provided around valve shaft 18 between the butterfly disc 20 and shaft yoke 16. Also, O-rings 79 are disposed around the outer diameter of bearing 74.

Indicator means 80 may be disposed on cam housing 26 externally of frame 24 for indicating the relative position of universal cam assembly 12, and thereby the relative volume of the flow through valve 10.

The invention set forth hereinabove is entitled to encompass other specific embodiments without departing from the spirit or the essential characteristics of the present invention. The above embodiments are therefore to be considered in all respects as being illustrative and not restrictive in any manner of the scope of the present invention, which scope is supplemented by the dependent claims and all changes which come within the meaning and range of equivalency of the claims are therefore intended to be embraced within the scope of the present invention.

What is claimed is:

1. An improved positive pullback synchro valve actuator comprising:

a universal cam assembly having a frame and supporting at least one deformable carrier cam strip means operatively contacted on a first side thereof by the respective ends of a plurality of contour adjustment screws diposed in spaced array therealong, and means for selectively adjusting the depth of said screws to adjust the shape of said deformable carrier cam strip means;

plunger means disposed for reciprocal movement generally transversely of and operatively connected to said carrier cam strip means for positive, reciprocal, push and pull movement by means of said plunger means being driven by said cam strip means in either longitudinal direction;

return spring means for urging said plunger means in a return longitudinal direction;

rotational means including a shaft yoke attached to said plunger means and a rotational valve shaft that is rotationally driven by said shaft yoke, said rotational means attached to and rotationally driven in a first rotational direction by the positive, reciprocal, push and pull movement of said plunger means and said rotational means driven in an opposite rotational direction by said return spring means; and butterfly valve means attached to said valve shaft which is directly driven by said rotational means in said rotational directions to open and close said butterfly valve means.

2. The improved positive pullback synchro valve actuator of claim 1 wherein said operative connection between said plunger means and said cam strip means is by means of a cam follower disposed on said plunger.

3. The improved positive pullback synchro valve actuator of claim 2 wherein said cam follower is substantially U-shaped to accommodate said cam strip means in the channel thereof.

4. The improved positive pullback synchro valve actuator of claim 1 wherein said contour adjustment screws of said universal cam assembly are disposed in end view generally in the shape of a portion of an arc of a circle.

5. The improved positive pullback synchro valve actuator of claim 4 wherein said frame of said universal cam assembly is mounted for partial rotation with respect to said plunger means to provide circulocontacting motion to said carrier cam strip means relative to said plunger means.

6. The improved positive pullback synchro valve actuator of claim 1 wherein guide means carried by said frame are provided for guiding said cam strip means in contacting relationship with said plunger means.

7. The improved positive pullback synchro valve actuator of claim 1 wherein said contour adjustment screws are threadably disposed through said frame for depth adjustment with respect thereto.

8. The improved positive pullback synchro valve actuator of claim 1 wherein said contour adjustment screws include rotational engagement means at the distal end thereof for application of rotational force thereto to adjust the depth disposition thereof.

9. The improved positive pullback synchro valve actuator of claim 1 wherein said carrier cam strip means comprises at least one lower cam strip and at least one upper cam strip.

10. The improved positive pullback synchro valve actuator of claim 9 wherein said at least one upper cam strip is secured to said contour adjustment screws near the proximal end thereof by E-rings.

11. The improved positive pullback synchro valve actuator of claim 1 wherein said plunger means is supported and directed for longitudinal motion by a plunger bushing.

12. The improved positive pullback synchro valve actuator of claim 1 wherein said return spring means comprises a return spring shaft portion of said plunger and coil spring means mounted on said return spring shaft portion.

13. The improved positive pullback synchro valve actuator of claim 12 wherein said return spring shaft is supported at the distal end thereof by shaft retention means.

14. The improved positive pullback synchro valve actuator of claim 12 further comprising coil spring retention means for maintaining said coil spring means around said return spring shaft in non-binding relationship.

15. The improved positive pullback synchro valve actuator of claim 1 wherein:

said rotational means comprises shaft yoke means connected to and disposed transversely of said plunger means for converting the longitudinal motion of said plunger means into limited reciprocal rotational movement, said shaft yoke means including valve shaft engagement means; said a valve shaft engaged by said valve shaft engagement means of said shaft yoke means to be urged into limited reciprocal rotational motion therefrom; and said butterfly valve means comprises a butterfly valve disc connected to said valve shaft to be adjustably opened and closed by the limited reciprocal rotational motion of said valve shaft; and a butterfly seat disposed for open and closed engagement by said butterfly valve disc.

16. The improved positive pullback synchro valve actuator of claim 15 further comprising bearing means disposed on said valve shaft for journaling the same for limited reciprocal rotational motion.

17. The improved positive pullback synchro valve actuator of claim 15 further comprising sealing means disposed on said valve shaft between said butterfly disc and said shaft yoke means.

18. The improved positive pullback synchro valve actuator of claim 17 wherein said sealing means comprise at least one O-ring.

19. The improved positive pullback synchro valve actuator of claim 15 wherein:

said valve shaft is attached to and extends across said butterfly valve disc substantially along a diameter thereof.

20. The improved positive pullback synchro valve actuator of claim 15 wherein:

said butterfly valve disc is supported and positioned within said butterfly valve seat substantially by means of said valve shaft.

21. The improved positive pullback synchro valve actuator of claim 15 wherein:

said butterfly valve disc is disposed within said butterfly valve seat for opening and closing by rotational movement about an axis common to the longitudinal axis of said valve shaft.

22. The improved positive pullback synchro valve actuator of claim 21 wherein said axis of rotational movement of said butterfly valve disc for the opening and closing thereof is disposed along a diameter thereof.

23. The improved positive pullback synchro valve actuator of claim 15 wherein said valve shaft is disposed for no substantial longitudinal movement.

24. The improved positive pullback synchro valve actutor of claim 1 further comprising indicator means disposed externally of said frame for indicating the relative position of said universal cam assembly, and thereby the relative volume of flow through the valve.

* * * * *